Sept. 9, 1930.  F. C. HARRIS  1,775,429
YOKE CONSTRUCTION FOR SUSPENDED CARRIERS
Filed March 28, 1927
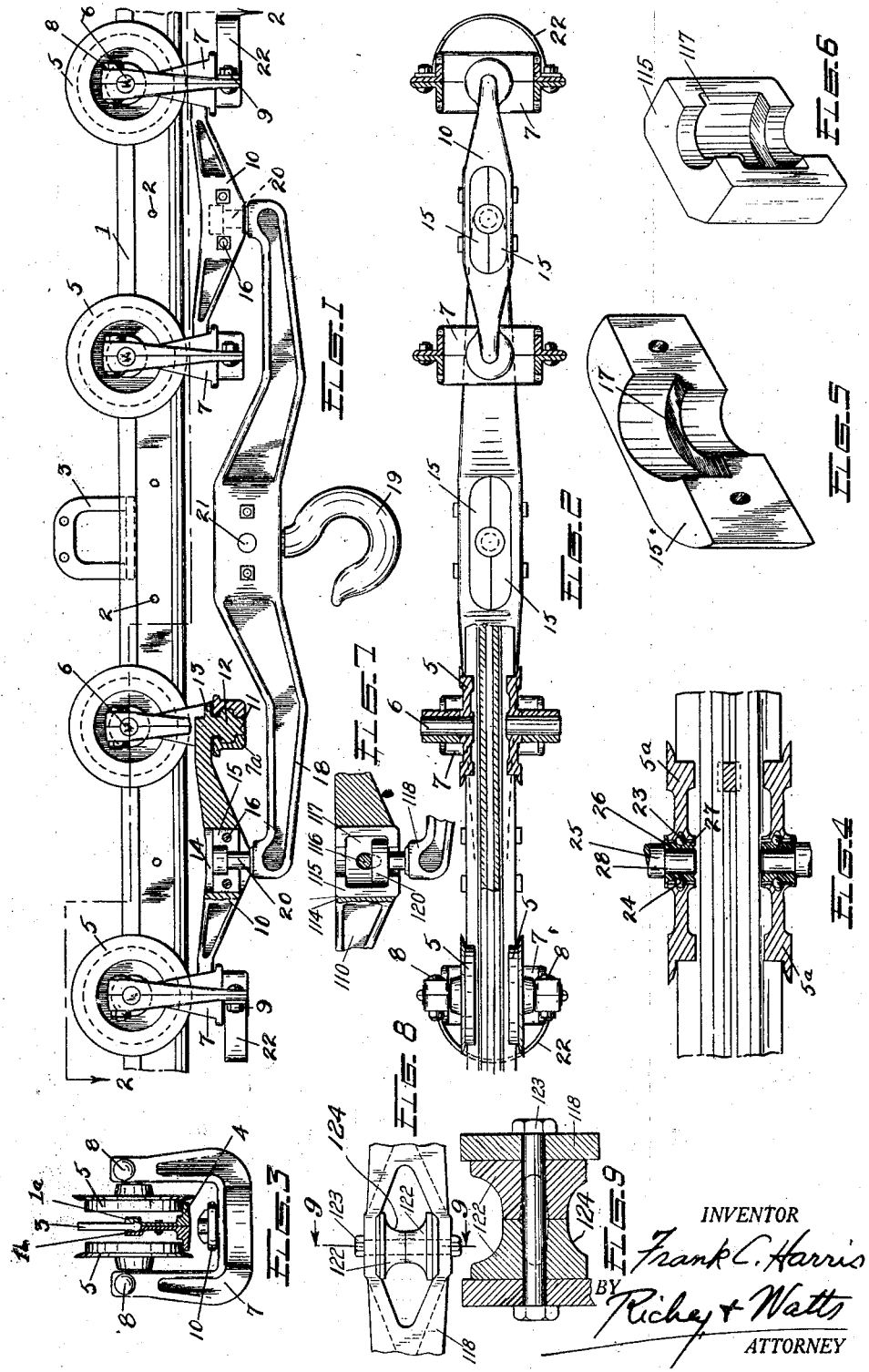
INVENTOR
Frank C. Harris
BY Richey + Watts
ATTORNEY Patented Sept. 9, 1930

1,775,429

UNITED STATES PATENT OFFICE

FRANK C. HARRIS, OF CLEVELAND, OHIO

YOKE CONSTRUCTION FOR SUSPENDED CARRIERS

Application filed March 28, 1927. Serial No. 178,838.

This invention relates to trolleys for suspended carriers. It is particularly concerned with new and improved load bars and their mountings for such trolleys.

One object of the invention is to construct a one piece load bar which can be quickly and easily assembled and disassembled in its various positions with the trolley hanger and associated load bars.

Another object is to construct a load carrying trolley for a suspended track which is adapted to support a load in close proximity to the track.

Another object is to construct a trolley for a suspended track in which the shocks and bumps incident to contact of two trolleys on the track are conducted through the trolley frame without causing substantial bending stresses in the frame.

A further object is to construct a trolley for a suspended track in which the yokes and yoke bars form a compact assembly with a track either free from or provided with ribs or similar projections depending below the wheel-carrying track flanges.

A still further object is to provide a suspended trolley with a bumper which will receive and transmit shocks and bumps incident to contact of two trolleys on curves substantially in the same manner as on straight track.

Other objects will appear and be pointed out in the following specification and claims.

In the figures attached to and forming a part of this specification:

Fig. 1 is a side elevation of a trolley constructed in accordance with my invention, parts being shown in section, Fig. 2 is a top view partly in section taken on line 2—2 of Fig. 1, Fig. 3 is an end view of a trolley showing a supporting rail in section, Fig. 4 is an enlarged sectional view showing an alternative construction of trolley wheel, Fig. 5 is a perspective view of one form of block used in connecting parts of the trolley, Fig. 6 is a similar view of a modified form of block, Fig. 7 is a fragmentary view, partly in section, showing the block of Fig. 6 in assembled relation with other parts, Fig. 8 is a fragmentary plan view of a modified load-carrying member, and Fig. 9 is a section taken on line 9—9 of Fig. 8.

Referring now more particularly to Figs. 1 to 3 inclusive, numeral 1 indicates a suspended track made up of two similarly shaped parts, 1ª and 1ᵇ, held in assembled relation with each other and with a hanger 3 by suitable securing means such as bolts 2, the hanger serving as a means of securing the track to an overhead support. The track 1 has outstanding flanges 4 serving as tracks upon which the wheels of the trolley run.

In these figures the trolley is shown as being formed with four sets of wheels 5 arranged in pairs, each wheel being rotatably carried on the end of a short axle or shaft 6 which is clamped against rotation in a yoke 7. The yokes, as here shown, are each made up of two substantially similar parts secured together as by means of bolts 8 and 9. The yoke is of such size that when the wheels 5 are disposed to run on the opposite flanges 4 of the track 1, the arms of yoke 7 will depend past the track and clear the underside of the track 1 sufficiently to permit a yoke bar 10 to be assembled on top of the yokes and underneath the rail 1.

The yoke bars 10 are short members which serve to connect two adjacent yokes to form a four wheeled trolley, each yoke bar is provided at its end with a swivel head, which may consist of a cylindrical portion 11 having an enlarged annular rib 12 and, if desired, an enlarged base 13. These swivel heads find a seating in the yokes 7 where a suitable swivel recess 7ª is provided in the meeting faces of the yokes. In this manner the yokes 7 and yoke bar 10 form a swiveled structure in which the yokes may turn relative to the yoke bars as in following a curved track. Each yoke bar 10 is provided intermediate its ends with a recess or opening 14 preferably extending therethrough in which is provided suitable means for supporting a load. As clearly shown in Fig. 1, the yoke bars 10 are made of a single piece of metal which may be and preferably is a casting, although it also may be made by forging. In the opening 14 is disposed a pair of swivel blocks 15 (Fig. 5) which are held in place by bolts 16 and which have a shoulder 17 to receive the swivel head of a load carrying member; for example, the load bar 18. The swivel blocks 15 may be removed from and reversed in the opening 14 so that if desired, the yoke bar 10 may be reversed from the position shown in Fig. 1 and suspended from, instead of being supported upon, the yokes 7 by simply loosening bolts 8 and 9. Such reversal is frequently desirable where the trolley described is to be used with a track having a rib or other depending projection below the wheel supporting flanges. By reversing the yoke bars 10 additional space between the lower side of the wheel supporting flanges and the upper side of the transverse portion of the yoke is provided to accommodate such depending projection.

The eight wheel trolley of Fig. 1 includes, in addition to the structure just described, a main load bar 18 which may be formed of a single casting or forging, having a swivel head at either end to be supported, as by swivel blocks 15, in yoke bars 10 and having load carrying means provided intermediate its ends. In Fig. 1 is shown a load carrying member in the form of a hook 19 having a swivel head (not shown) corresponding generally to the swivel head 20 at either end of the bar 18. Swivel blocks (not shown) are provided in the bar 18 similar to the swivel blocks 15 to receive the member 19. Holes 21 through which a bar may be placed afford a means for alternatively supporting a load from the bar 18. The hook 19 and swivel blocks 15 may be removed and a bar placed through the holes 21 upon which a load may be directly fastened; for example a block hoist, having a hook to engage over the bar. The hole or recess in the bar 18 to receive the hook 19 and swivel blocks is, as shown, preferably, enlarged sufficiently lengthwise of the bar, to accommodate various load supporting means.

It will be understood that a single yoke and pair of wheels may constitute a trolley; that a swivel load-carrying member, such for example as hook 19 may be retained in the swivel socket 14 in the yoke; and that a similar member such as hook 19 may be retained in socket 7ª of yoke 7.

Bumpers 22 secured to yoke 7 are adapted to engage with corresponding bumpers of other trolleys for transmitting forces from one trolley to the next. In Fig. 1 a bumper 22 is shown at either end of the trolley but it will be understood that in the case of a four wheel trolley a bumper 22 will be desirable with each yoke 7 and when the trolley consists of but a single yoke, there will be two bumpers carried, one on either side thereof.

I preferably curve the bumpers 22 so that they constitute arcs of circles described about the center of the swivel recess of the yoke 7. The bumpers 22 are, as will be noted by an examination of Fig. 1, disposed in substantially the same horizontal plane with the swivel connection between the yoke 7 and yoke bar 10, and between yoke bar 10 and the load bar 18, and with the load carrying member 21 or the swivel blocks contained in load bar 18. The curvature of the bumpers 22 secures substantially the same contact between two adjacent bumpers on curves as well as on straight tracks, while the horizontal alignment of the bumpers 22, with the load carrying part and points of connection of the trolley frame, results in a substantially complete transference or absorption of the shocks and bumps due to contact between two trolleys through and by the trolley frame, without noticeable bending stresses being exerted on any of the part of the trolley frame. This, of course, has a direct result in preventing a binding of the parts and unnecessary wear both due to the shocks of one trolley bumping another or of one trolley pushing one or more other trolleys ahead of it on the tracks.

It will be noted that the yokes 7 and yoke bar 10 when assembled as shown in Fig. 1 have their bottom surfaces in substantially the same plane. This not only results in a compact structure but enables the four wheel trolley to pass over any object that the yoke 7 would clear.

It will be noted that in Fig. 1 I have shown a trolley with an exceptionally compact arrangement of parts, the yoke bars 10 being disposed closely adjacent to the underside of the track 1 while the load bar 18 has its load carrying intermediate portion disposed largely in the same horizontal plane with the yoke bar 10 and hence disposed closely adjacent to the underside of the track 1. This provides an economy in head room which is often at a premium. When it becomes necessary, because of depending ribs on track 1 or for other reasons, to reverse the yoke bars 10 the load carrying portion of the load bar 18 is still disposed closely adjacent to and in compact relation with the rail or track.

In Fig. 4 I have shown a modified form of wheel and wheel supporting members. In this case the wheel 5ª is provided in its hub portion with a ball race 23 in which ball bearings 24 are disposed. The wheel axle or shaft 25 carries two rings 26 and 27, each provided with co-operating ball seats and forming the inner ball races. The ring 26 bears against a shoulder 28 on the axle 25, while the other ring 27 is held in assembled position for example, by suitable peening over the end of the axle 25.

Figure 5 is a perspective view of one of the swivel blocks 15 shown in Figs. 1 and 2, from which it will be clearly understood the manner in which the shoulder 17 is formed.

Figures 6 and 7 show a modified form of swivel blocks 115, in which the interior is recessed as at 117 to receive the disc-like head 120 carried by the ends of load bars 118. It will be noted that the swivel-head is, in this modification, well below the center of the blocks and the head is retained in this position and in contact with the lower shoulder of recess 117 by a single, central, transverse bolt 116 which also serves to retain the blocks within the recesses 114 in yoke bar 110.

Figures 8 and 9 indicate a modified form of hook-holding pivot which consists of a spool-like member made of two blocks 122, the spool extending transversely across the central aperture in the yoke bar 118, and retained in place by a single bolt 123. A double ended hook or the like may engage the upper surface of this spool or opposed jaws may engage recesses 124 formed in the sides thereof and support the load to be carried.

While I have described the illustrated embodiments of my invention in some particularity, these are shown by way of illustration only and I claim as my invention all embodiments coming within the scope of the appended claims.

What is claimed is:

1. A load bar for a trolley of the suspended type comprising a member having swivel engaging shoulders at each end and an intermediate swivel receiving opening extending therethrough and reversible swivel forming blocks secured in said opening.

2. A trolley for suspended conveyors comprising a plurality of yokes each carrying a pair of wheels to engage opposite sides of a suspended rail, the yokes being formed of parts secured together to provide a swivel opening, a one piece load bar having a swivel engaging shoulder at either end seating in the corresponding swivel openings of said yokes and joining two of the yokes together, the said bar having an opening intermediate its ends, and means in the said opening for supporting load-carrying means.

3. A trolley for suspended conveyors comprising two sets of yokes each carrying a pair of wheels to engage opposite sides of a suspended rail, the yokes being formed of parts secured together to provide a swivel opening, auxiliary load bars swivelly connecting the yokes of each pair of yokes and a main load bar swiveled in the auxiliary load bars and having load carrying means in an opening intermediate its ends.

4. A trolley for suspended conveyors comprising oppositely disposed rail engaging wheels arranged in pairs, a yoke suspended from each pair of wheels and having a swivel head receiving opening and a one piece load bar swiveled in the swivel receiving openings of each of two adjacent yokes, the said bar having an opening extending therethrough intermediate its ends and having load supporting means in the said opening.

5. A trolley for a suspended conveyor comprising two pairs of yokes each carrying rail engaging wheels, a yoke bar for each pair of yokes and having swiveled connections therewith, each yoke bar having an opening intermediate its ends and swivel-forming means disposed therein, and a load bar swiveled in the said swivel forming means of the yoke bars and provided intermediate its ends with load carrying means.

6. A trolley for a suspended conveyor comprising two pairs of wheel carrying yokes, one piece yoke bars for each pair of yokes, and a load bar joined to the yoke bars by swiveled connections, the said bars each having an aperture intermediate its ends with swivel forming means secured therein.

7. A trolley for a suspended track comprising two wheel carrying yokes, a yoke bar having a swivel connection at its ends with the said yokes and having a load supporting portion intermediate its ends, and a bumper secured to one of the said yokes and disposed in substantially the same horizontal plane with the said swivel connections and load supporting portion.

8. A trolley for a suspended track comprising two pairs of wheel carrying yokes, two yoke bars, each bar having swiveled connections at its ends with a pair of yokes, a load bar having swiveled connections at its ends with the yoke bars and a bumper carried by a yoke and disposed on substantially the same horizontal plane with the said swiveled connections.

9. A trolley for suspended track, comprising two pairs of wheels to run on outstanding track flanges, a yoke carried by each of a pair of wheels and extending beneath the track, and a yoke bar resting on and swiveled to the yokes, the top of the yoke bar lying closely adjacent to the underside of the track, the lower side of the yoke bar lying in substantially the same horizontal plane as the bottom of the yokes.

10. A load bar for a trolley of the suspended type comprising a member having spaced swivel engaging heads for engagement in cooperating openings in trolley yokes and provided with an intermediate swivel receiving opening, and means disposed in the opening for supporting load carrying means therein.

11. A load bar for a trolley of the suspended type comprising a member having spaced swivel engaging heads for engagement in cooperating openings in trolley yokes and provided with an intermediate opening, and means movable relative to the member disposed in said opening for supporting load carrying means in the member.

12. A load bar for a trolley of the suspended type comprising a member having supporting swivel heads integral therewith and adapted to seat in swivel members.

13. A load bar for a trolley of the suspended type comprising a member having integral therewith swivel heads disposed angularly to the member and adjacent the ends thereof and adapted to be supported by cooperating swivel head receiving parts around said heads, said member provided with an intermediate opening, and removable supporting means disposed in the opening.

14. A load bar for a trolley of the suspended type comprising a member having spaced swivel engaging heads and provided with an intermediate opening, supporting means disposed in the opening, and a hook for supporting a load, said hook carried by the supporting means.

15. A trolley assembly for suspended track including trolley wheels arranged in pairs to run on a suspended track, U-shaped yokes each connecting a pair of wheels and extending beneath the track each yoke being provided with a swivel head receiving opening, auxiliary load bars each resting on and disposed between two adjacent yokes and the track and having swivel heads near their ends disposed in the said receiving openings of such yokes, each auxiliary load bar having a swivel head receiving opening intermediate its ends, a main load bar suspended from two adjacent auxiliary load bars and having swivel heads near its ends retained in the swivel receiving openings of the auxiliary load bars, and means intermediate the ends of the main load bar for securing a load thereto.

16. A load bar for trolleys for suspended track comprising a member having an enlarged middle portion and smaller end portions, provided with laterally extending swivel heads, the middle portion having an opening to receive a load carrying member.

17. A load bar for trolleys for suspended track comprising a member having an enlarged middle portion and smaller end portions, provided with laterally extending swivel heads, the middle portion having an opening therein and being adapted to support in the opening a load carrying member having a swivel head.

18. A load bar for a trolley of the suspended type, comprising a member having spaced, swivel engaging heads for engagement in co-operating openings in trolley yokes and provided with an intermediate opening for receiving a load carrying member, and means secured in the opening for supporting in the opening the open hook portion of a load carrying member.

19. A load bar for a trolley of the suspended type, comprising a member having attaching members near the ends thereof and having an intermediate opening, supporting means disposed in the opening, the opening being adapted to permit the insertion of the open curved portion of a load supporting hook, and the supporting means being adapted to be partly encircled by and to support the said portion of the hook in the opening.

20. A load bar for trolleys for suspended track, comprising a member having an enlarged middle portion and smaller end portions, attaching means extending laterally from the end portions, the middle portion having an opening to receive therein the open hooked end of a load carrying member.

21. A load bar for trolleys for suspended track, comprising a member having an enlarged middle portion and smaller end portions, attaching means extending laterally from the end portions, the middle portion having an opening therein into which the open hooked end of a load hook may be inserted, and means disposed in the said openings and engageable with the said end of a load hook to support the latter within the load bar.

In testimony whereof I hereunto affix my signature this 6th day of January, 1927.

FRANK C. HARRIS.